US011374665B1

(12) United States Patent
Ryan et al.

(10) Patent No.: US 11,374,665 B1
(45) Date of Patent: Jun. 28, 2022

(54) MILLIMETER RADIO WAVE LINE-OF-SIGHT PREDICTION FOR BASE STATIONS

(71) Applicant: T-Mobile USA, Inc., Bellevue, WA (US)

(72) Inventors: Alexander Ryan, Shoreline, WA (US); Alan MacDonald, Bellevue, WA (US); Marcellin Kibonge, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/236,956

(22) Filed: Apr. 21, 2021

(51) Int. Cl.
*H04B 17/327* (2015.01)
*H04B 17/391* (2015.01)
*H04B 17/10* (2015.01)

(52) U.S. Cl.
CPC ......... *H04B 17/327* (2015.01); *H04B 17/103* (2015.01); *H04B 17/391* (2015.01)

(58) Field of Classification Search
CPC .......................... H04B 17/327; H04B 17/103
See application file for complete search history.

(56) References Cited

U.S. PATENT DOCUMENTS

2021/0282096 A1\* 9/2021 Caporal del Barrio ..................... H04W 52/282

\* cited by examiner

*Primary Examiner* — Sulaiman Nooristany
(74) *Attorney, Agent, or Firm* — Han Santos, PLLC

(57) ABSTRACT

Multiple Reference Signal Received Power (RSRP) measurements are obtained at a sampling location for non-millimeter wave radio signals of multiple non-millimeter wave frequencies originating from an antenna site of a base station. A line-of-sight (LOS) distance, an azimuth angle, and an elevation angle between the antenna site and the sampling location are computed. A corresponding Effective Isotropic Radiated Power (EIRP) measurement at the sampling location for each non-millimeter wave radio signal of the non-millimeter wave radio signals is calculated based on a radio transmission power and an antenna gain factor associated with each non-millimeter wave radio signal. A corresponding path loss exponent at the sampling location for each non-millimeter wave radio signal is then computed based at least on a difference between a corresponding RSRP measurement and the corresponding EIRP measurement, the LOS distance, and a wavelength of a corresponding non-millimeter wave frequency.

20 Claims, 6 Drawing Sheets ated by the radio antenna.

MILLIMETER RADIO WAVE LINE-OF-SIGHT PREDICTION FOR BASE STATIONS

BACKGROUND

Quality 5G millimeter wave (mmV) service requires a line-of-sight (LOS) radio wave path between customer handsets and a 5G mmV radio-equipped base station. Radio signals in the mmV range are highly susceptible to obstruction and scattering by natural and man-made objects. Current site selection for 5G mmV radio deployment relies on complex ray-tracing models and expensive but often incomplete clutter and foliage data from third-party vendors to determine whether there are sufficient LOS radio wave paths at a candidate site for proper 5G mmV radio deployment. Another option is to perform time-consuming drive-and-measure tests to physically survey the area around a candidate site for sufficient LOS radio wave paths for 5G mmV radio deployment.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
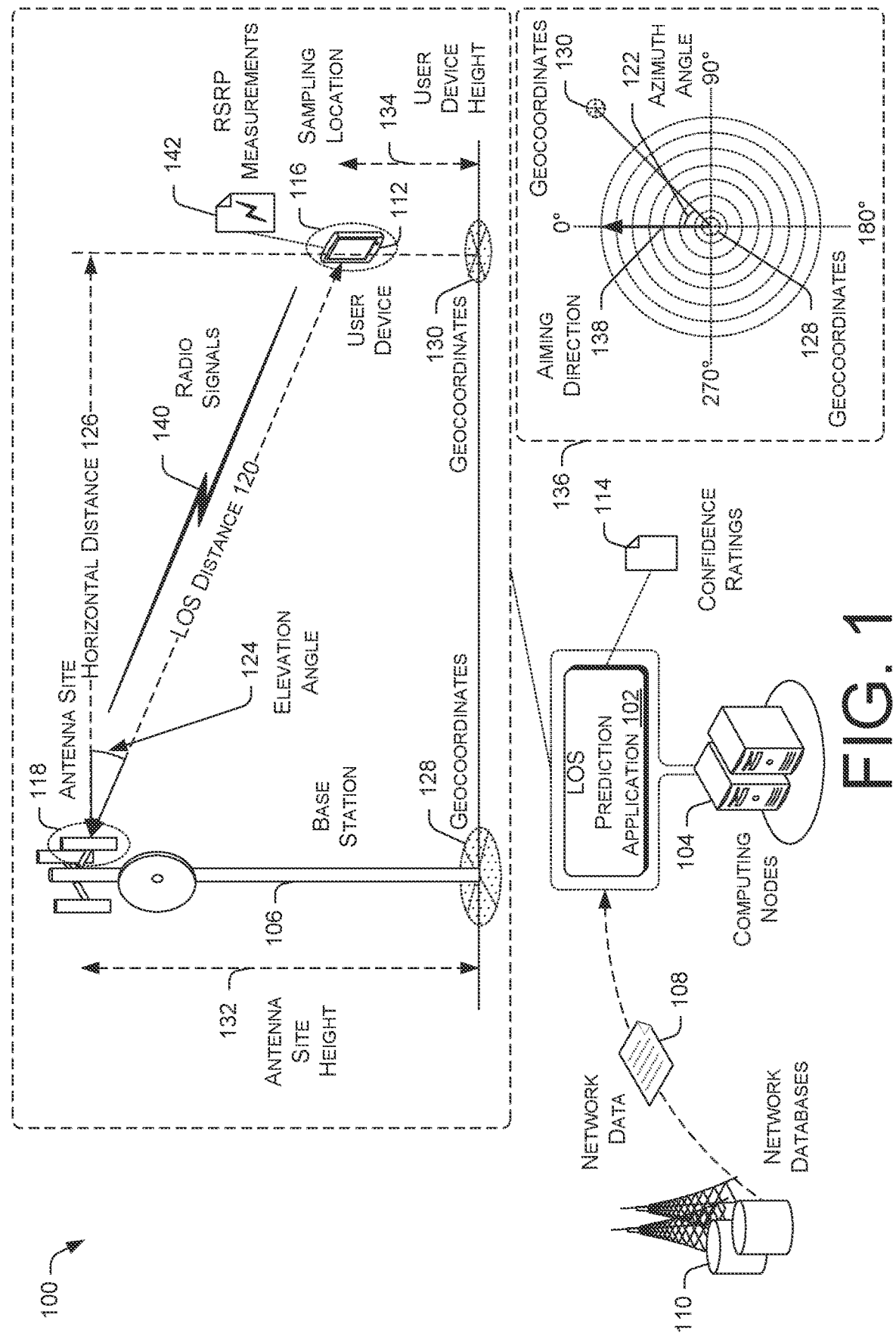
FIG. 1 illustrates an example architecture that enables the prediction of line-of-sight (LOS) radio wave paths for the deployment of a millimeter wave (mmV) radio at a base station based on existing network data.

This disclosure is directed to techniques that enable a mobile network operator (MNO) to use existing network data to predict line-of-sight (LOS) radio wave paths for the possible deployment of a millimeter wave (mmV) radio antenna at an antenna site of a base station. The mmV radio may be used to provide wireless communication uplinks and downlinks to user devices in the vicinity of the base station. The existing network data may include radio signal measurements collected by user devices belonging to the subscribers of the MNO at multiple sampling locations around the base station. In various instances, the radio signal measurements collected at a sampling location may include Reference Signal Received Power (RSRP) measurements for non-millimeter wave radio signals of radio antennas that are currently deployed at the antenna site of the base station, as well as corresponding geolocation information (e.g., latitude, longitude, and elevation) of the sampling location. The deployed radios may include non-millimeter wave LTE and/or 5G radios. The non-millimeter wave radio signals may include high-band, mid-band, and/or low-band radio signals. The existing network data may further include geolocation information of each base station in relation to the sampling locations, the height of the antenna site at each base station, the antenna gain factor at each base station, wavelengths of the non-millimeter wave radio signals emanating from each base station, and/or so forth.

In some embodiments, a LOS prediction application may analyze the existing network data associated with a sampling location to compute a confidence rating (e.g., a low, moderate, or high confidence rating) for whether there is a sufficient LOS to the sampling location from the antenna site of the base station. In at least one embodiment, by using the confidence ratings computed for multiple sampling locations surrounding the base station, the LOS prediction application may generate a visual representation (e.g., a deployment suitability map) of the suitability for deploying the mmV radio antenna at the antenna site of the base station.

In order to compute a confidence rating for a sampling location with respect to an antenna site of the base station, a LOS distance, an azimuth angle, and an elevation angle between the antenna site and the sampling location may be initially computed. A corresponding Effective Isotropic Radiated Power (EIRP) measurement may be calculated at the sampling location for each of the non-millimeter wave radio signals of multiple non-millimeter wave frequencies based at least on corresponding radio transmission power of each non-millimeter wave radio signal and a corresponding antenna gain factor associated with each non-millimeter wave radio signal at the azimuth angle and the elevation angle. A corresponding path loss exponent may be further computed at the sampling location for each non-millimeter wave radio signal of the non-millimeter wave radio signals based at least on the difference between a corresponding RSRP measurement and the corresponding EIRP measurement, the LOS distance, and a wavelength of a corresponding frequency. The confidence rating may then be computed for the antenna site at the base station based at least on path loss exponents of the non-millimeter radio signals of multiple non-millimeter wave frequencies. For example, the confidence rating may be computed based on the path loss exponents using predetermined threshold values or via a machine-learning model.

By using existing network data to predict LOS radio wave paths for the deployment of an mmV radio at an antenna site of a base station, an MNO may eliminate the use of complex ray-tracing models and expensive but often incomplete clutter and foliage data from third-party vendors. Further, the need for the MNO to conduct time-consuming drive-and-measure tests to physically survey the area around the base station for mmV radio deployment may also be eliminated. The techniques described herein may be implemented in a number of ways. Example implementations are provided below with reference to the following figures.

Example Architecture

FIG. 1 illustrates an example architecture 100 that enables the prediction of line-of-sight (LOS) radio wave paths for the deployment of a millimeter wave (mmV) radio at a base station based on existing network data. The architecture 100 may include a LOS prediction application 102 that executes on one or more computing nodes 104. The LOS prediction application 102 may be used to predict LOS radio wave paths for the possible deployment of an mmV radio antenna at an antenna site of a base station. For example, the base station may be a base station 106 that is operated by a mobile network operator (MNO). In various embodiments, the LOS prediction application 102 may receive network data 108 from one or more network databases 110. The network databases 110 may be databases maintained by the MNO. The network data 108 may include radio signal measurements collected by user devices (e.g., a user device 112) used by subscribers of the MNO at multiple sampling locations around the base station. For example, the user devices may send the radio signal measurements to the network databases 110 as the user devices interact with various base stations of a wireless carrier network operated by the MNO.

The radio signal measurements collected at each sampling location for an antenna site of a base station may include Reference Signal Received Power (RSRP) measurements for non-millimeter wave radio signals of radios, such as non-millimeter wave LTE and/or 5G radios, that are currently deployed at the antenna site, as well as corresponding geolocation information (e.g., latitude, longitude, and elevation measurements) of each sampling location. The non-millimeter wave radios signals may include high-band (e.g., 2145 MHz), mid-band (e.g., 1972.50 MHz), and/or low-band radio (e.g., 731.50 MHz) signals. The network data 108 may further include base station information, such as base station identification information, geocoordinates of each base station (longitude, latitude), height of the antenna site at each base station, antenna gain factor at each base station, wavelengths of the non-millimeter wave radio signals emanating from each base station, and/or so forth.

In some embodiments, the LOS prediction application 102 may analyze the network data associated with a sampling location to compute a confidence rating (e.g., a low, moderate, or high confidence rating) for whether there is a sufficient LOS to the sampling location from an associated antenna site of a base station. By using multiple confidence ratings 114 computed for multiple sampling locations surrounding the base station, the LOS prediction application 102 may generate a visual representation of the suitability for deploying the mmV radio antenna at the antenna site of the base station. For example, the visual presentation may be a deployment suitability map that depicts the geographical area surrounding the base station and encompassing the sampling locations. The map may include color representations of the confidence ratings at the various sampling locations near the base station, in which a unique color is used to illustrate a corresponding confidence rating.

In at least one embodiment, in order to compute a confidence rating for a sampling location 116 of the user device 112 with respect to an antenna site 118 of the base station 106, the LOS prediction application 102 may initially compute a LOS distance 120 between the antenna site 118 and the sampling location 116. The sampling location 116 is the location at which the user device 112 obtained corresponding radio signal measurements. The LOS prediction application 102 may further compute an azimuth angle 122 between the antenna site 118 and the sampling location 116, and an elevation angle 124 between the antenna site 118 and the sampling location 116. The LOS distance 120 may be computed using the Pythagorean theorem based on the horizontal distance 126 between the geocoordinates 128 (i.e., longitude and latitude) of the base station 106 and the geocoordinates 130 (i.e., longitude and latitude) of the sampling location 116, as well as a height difference between the antenna site height 132 of the base station 106 and the user device height 134 of the user device 112. The antenna site height 132 and the user device height 134 may be respective heights relative to a horizontal surface, e.g., mean sea level. Thus, such heights may also be referred to as elevation above mean sea level. For example, the antenna site height 132 may include the height of the base station 106 as well as any height of the structure and/or terrain underneath the base station 106. The user device height 134 of the user device 112 may be dependent on the position of a subscriber as the subscriber moves about terrains and/or structures in an area.

As illustrated in the top-down view 136, the azimuth angle 122 is the angle in a polar coordinate system between a principal aiming direction 138 of a radio antenna on the base station 106 and the sampling location 116. The base station 106 is centered at (0, 0) of the polar coordinate system, and the principal aim direction 138 is assigned 0° in the polar coordinate system. For example, a principal aiming direction of a radio antenna may be a main beam direction of the radiation pattern output by the radio antenna. Accordingly, the LOS prediction application 102 may use a trigonometry algorithm and the polar coordinate system centered at the geocoordinates 128 of the base station 106 to compute the azimuth angle 122 based on the geocoordinates 130 of the sampling location 116. Further, the LOS prediction application 102 may use the trigonometry algorithm to compute the elevation angle 124 based on the LOS distance 120 and the horizontal distance 126.

Following these computations, the LOS prediction application 102 may calculate a corresponding Effective Isotropic Radiated Power (EIRP) measurement at the sampling location 116 for each of the non-millimeter wave radio signals 140 of multiple non-millimeter wave frequencies emanating from the antenna site 118 on the base station 106. Each of the non-millimeter wave radio signals 140 is a radio signal of a different non-millimeter wave frequency. The EIRP measurements may be calculated based at least on corresponding radio transmission powers of the non-millimeter wave radio signals and corresponding antenna gain factors associated with the non-millimeter wave radio signals at the azimuth angle 122 and the elevation angle 124. The LOS prediction application 102 may further compute a corresponding path loss exponent at the sampling location 116 for each of the non-millimeter wave radio signals based at least on the difference between a corresponding RSRP measurement of the RSPP measurements 142 collected for the sampling location 116 and the corresponding calculated EIRP measurement, the LOS distance 120, and a wavelength of a corresponding frequency. Subsequently, the LOS prediction application 102 may compute the confidence rating for the base station 106 based at least on path loss exponents of the non-millimeter wave radio signals. For example, the confidence rating may be computed based on the path loss exponents using predetermined threshold values or via a machine-learning model by the LOS prediction application 102.

Example LOS Prediction Application Components

Figure 2:
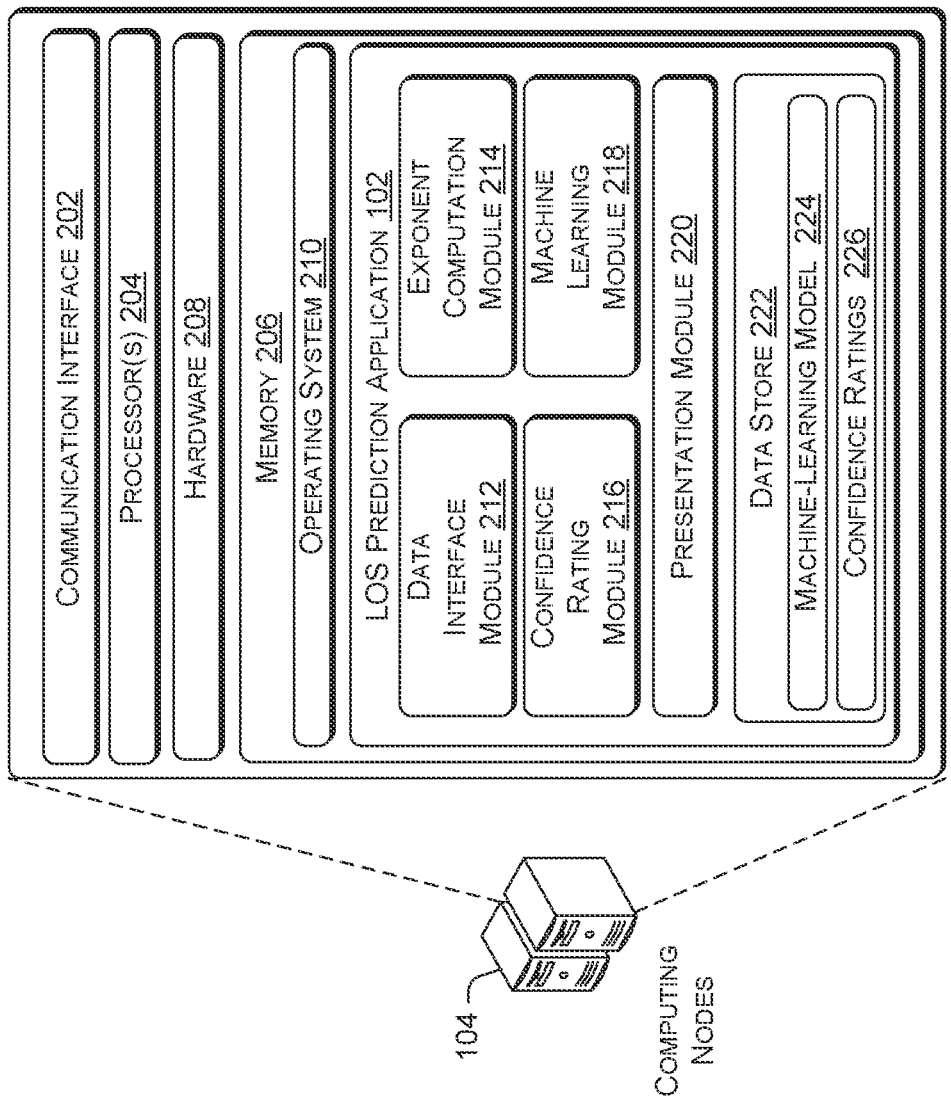
FIG. 2 is a block diagram showing various components of a LOS prediction application that uses existing network data to predict whether there are sufficient mmV LOS radio wave paths around a base station.

FIG. 2 is a block diagram showing various components of a LOS prediction application that uses existing network data to predict whether there are sufficient mmV LOS radio wave paths around a base station. The LOS prediction application 102 may be executed by the one or more computing nodes 104. The computing nodes 104 may provide a communication interface 202, one or more processors 204, memory 206, and hardware 208. The communication interface 202 may include wireless and/or wired communication components that enable the devices to transmit data to and receive data from other networked devices. The hardware 208 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 204 and the memory 206 of the computing nodes 104 may implement an operating system 210. In turn, the operating system 210 may provide an execution environment for the LOS prediction application 102. The operating system 210 may include components that enable the computing nodes 104 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The LOS prediction application 102 may include a data interface module 212, an exponent computation module 214, a confidence rating module 216, a machine-learning module 218, and a presentation module 220. The modules may include routines, program instructions, objects, and/or data structures that perform particular tasks or implement particular abstract data types. The memory 206 may also include a data store 222 that is used by the LOS prediction application 102.

The data interface module 212 may retrieve data from the one or more network databases 110 that store the network data 108. The data interface module 212 may access the network databases 110 via a network, such as a local area network (LAN), a larger network such as a wide area network (WAN), or a collection of networks, such as the Internet. In some embodiments, the network databases 110 may include databases that are maintained by an MNO who operates a wireless carrier network, such as a wireless carrier network that includes the base station 106.

In various embodiments, the data interface module 212 may use data adaptors to retrieve the network data 108 from the network databases 110. For example, the data interface module 212 may use data-agnostic data adaptors to access unstructured databases, and/or database-specific data adaptors to access structured databases. In some embodiments, the data interface module 212 may include a workflow scheduler that schedules the retrieval of the network data 108 according to a configurable policy. For example, the configurable policy may specify the source data locations, dates and times of data retrievals, frequency of data retrievals, triggering events for the data retrievals, handling procedures for late arrival data, a data retention period, data disposal following an expiration of the data retention period, and/or so forth. Alternatively, or concurrently, the data interface module 212 may be configured to receive at least some of the network data 108 from user devices or other data collection devices in real-time or near real-time as the data is uploaded by the devices to a core network of the wireless carrier network.

The exponent computation module 214 may use the network data 108 to calculate a path loss exponent for each of the non-millimeters radio signals emanating from an antenna site on a base station, such as the antenna site 118, in relation to a sampling location. Using the base station 106 as an example, the exponent computation module 214 may initially compute the LOS distance 120, the azimuth angle 122, and the elevation angle 124 based on the geocoordinates 128 of the base station 106, the geocoordinates 130 of the sampling location 116, and the height difference between the antenna site height 132 and the user device height 134. The computation may be performed by the exponent computation module 214 using trigonometry algorithms. The distance and the height may be measured in meters, and the angles may be measured in degrees.

For example, the horizontal distance 126 between the geocoordinates 128 (i.e., longitude and latitude) of the base station 106 and the geocoordinates 130 (i.e., longitude and latitude) of the sampling location 116 may be computed using the Pythagorean theorem. Further, given the horizontal distance 126 between the base station 106 and the sampling location 116, as well as the height difference (Δ) between the antenna site height 132 and the user device height 134, the Pythagorean theorem $a^2+b^2=c^2$ may be used to derive the LOS distance 120, in which a represents the horizontal distance 126, b represents the Δ between the antenna site height 132 and the user device height 134, and c represents the LOS distance 120. Additionally, given the horizontal distance 126 (*d*) and the height difference (Δ), the elevation angle 124 (∠ elevation) may be computed as: ∠ elevation=−a tan(Δ/d).

Figure 3:
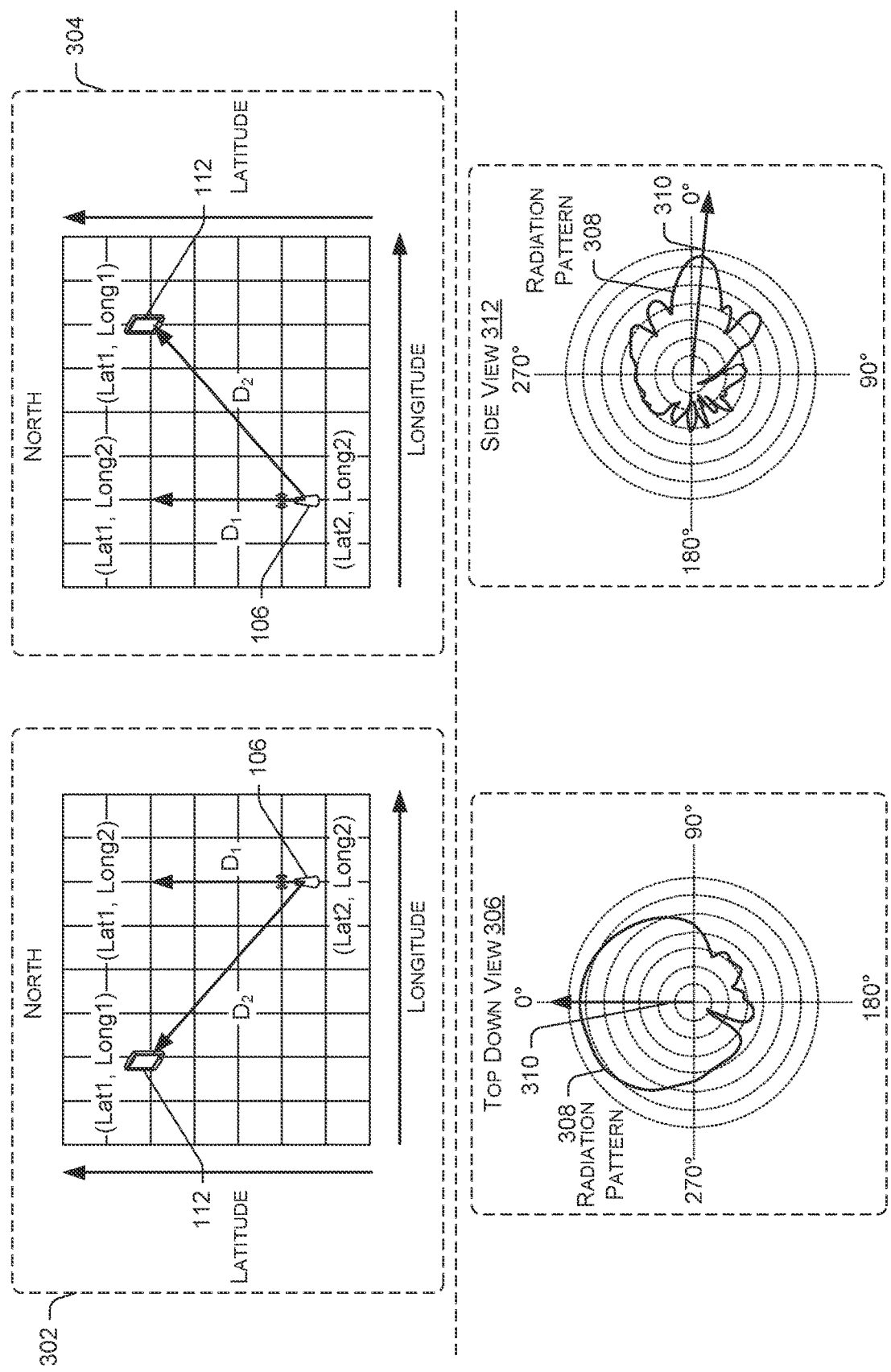
FIG. 3 illustrates example geocoordinate relationships between the locations of a base station and a user device, as well as multiple views of an example radiation pattern outputted by a radio antenna.

FIG. 3 illustrates example geocoordinate relationships between the locations of a base station and a user device. Based on the example longitudinal and latitudinal relationships 302 and 304 illustrated between the geocoordinates 128 of the base station 106 and the geocoordinates 130 of the user device 112 shown in FIG. 3, An azimuth angle (Φ) may be computed by $$\Phi = a\cos\left(\frac{D_1}{D_2}\right) * 180/\pi.$$

Further, since an azimuth angle computed using longitudes and latitudes of two positions always is relative to compass headings, the azimuth angle computed using the geocoordinates 128 and 130 may be normalized by the exponent computation module 214 with respect to the actual principal aiming direction of the antenna at the antenna site relative to compass headings. For example, if the principal aiming direction of an antenna at the antenna site 118 radiating the associated radio signals has a true north compass bearing of −80°, then the azimuth angle 122 may be computed as $$\Phi = a\cos\left(\frac{D_1}{D_2}\right) * 180/\pi) - 80.$$

In another example, if the principal aiming direction of an antenna at the antenna site 118 radiating the associated radio signals has a true north compass bearing of −150°, then the azimuth angle 122 may be computed as $$\Phi = a\cos\left(\frac{D_1}{D_2}\right) * 180/\pi) - 150.$$

Subsequently, the exponent computation module 214 may calculate a corresponding EIRP measurement at the sampling location 116 for each of the non-millimeter wave radio signals of the multiple non-millimeter wave frequencies originating from the antenna site 118. Each EIRP measurement may be calculated as: EIRP=Gain (∠ elevation, Φ)+$P_{tx}$. For example, with respect to the antenna site 118, ∠ elevation is the elevation angle 124, Φ is the azimuth angle 122, and $P_{tx}$ is the transmission power of the antenna transmitting the radio signal of a particular non-millimeter wave frequency, in which $P_{tx}$ may be measured in decibel-milliwatts (dBm). As expressed in the equation, the antenna gain factor, Gain (∠ elevation, Φ), may be dependent on the 3-dimensional ability of the antenna to focus energy in a specific direction specified by the elevation angle 124 and the azimuth angle 122. For example, the top-down view 306 of FIG. 3 shows an example radiation pattern 308 of the antenna with respect to an aiming point 310 of the antenna along a horizontal cross-section. Likewise, the side view 312 shows the example radiation pattern 308 of the antenna with respect to the aiming point 310 of the antenna along a vertical cross-section. In various embodiments, the network data 108 may include data on the transmission power of the antenna for each of the non-millimeter wave radio signals, as well as the antenna gain factor at the elevation angle 124 and the azimuth angle 122. Accordingly, the exponent computation module 214 may retrieve the relevant data to compute the corresponding EIRP measurement at the sampling location 116 for each of the non-millimeter wave radio signals.

Following the computation of the EIRP measurements, the exponent computation module 214 may calculate a corresponding path loss exponent at the sampling location 116 for each of the non-millimeter wave radio signals originating from the antenna site 118. Each of the path loss exponent, A, may be calculated using the following equation:

$$A=(EIRP-RSRP)/\log_{10}(4*\pi*LOS\ distance/wavelength)$$

In an example with respect to the antenna site 118, the EIRP in the above equation is the corresponding EIRP measurement calculated for the corresponding non-millimeter wave frequency of the non-millimeter wave radio signal in dBm, RSRP in the above equation is the corresponding RSRP measurement for the non-millimeter wave frequency in dBm, the LOS distance in the above equation is the LOS distance 120, and the wavelength in the above equation is the wavelength of the non-millimeter wavelength in meters. In some instances, the wavelength may be derived from the relationship c/f, in which f is the frequency of the non-millimeter wave radio signal emanating from the antenna site 118 in Hertz, and c is the speed of light in meters per second (m/s). The corresponding RSRP measurement is the measurement obtained by the user device 112 at the sampling location 116 for the antenna site 118. The network data 108 obtained by the LOS prediction application 102 may include the frequency of each non-millimeter wave radio signal emanating from the antenna site 118 and the corresponding RSRP measurement. In this way, the exponent computation module 214 may calculate a corresponding path loss exponent at the sampling location 116 for each of the non-millimeter wave radio signals of multiple non-millimeter wave frequencies originating from the antenna site 118.

Furthermore, the exponent computation module 214 may also compute additional path loss exponents for other sampling locations with respect to the antenna site 118, as well as sampling locations related to antenna sites of other base stations in a similar manner. Generally speaking, the theoretical path loss exponent value A for a completely clear LOS is 20. However, as environmental clutter increasingly diminishes the LOS, A will increasingly approach a value of 40.

Figure 5:
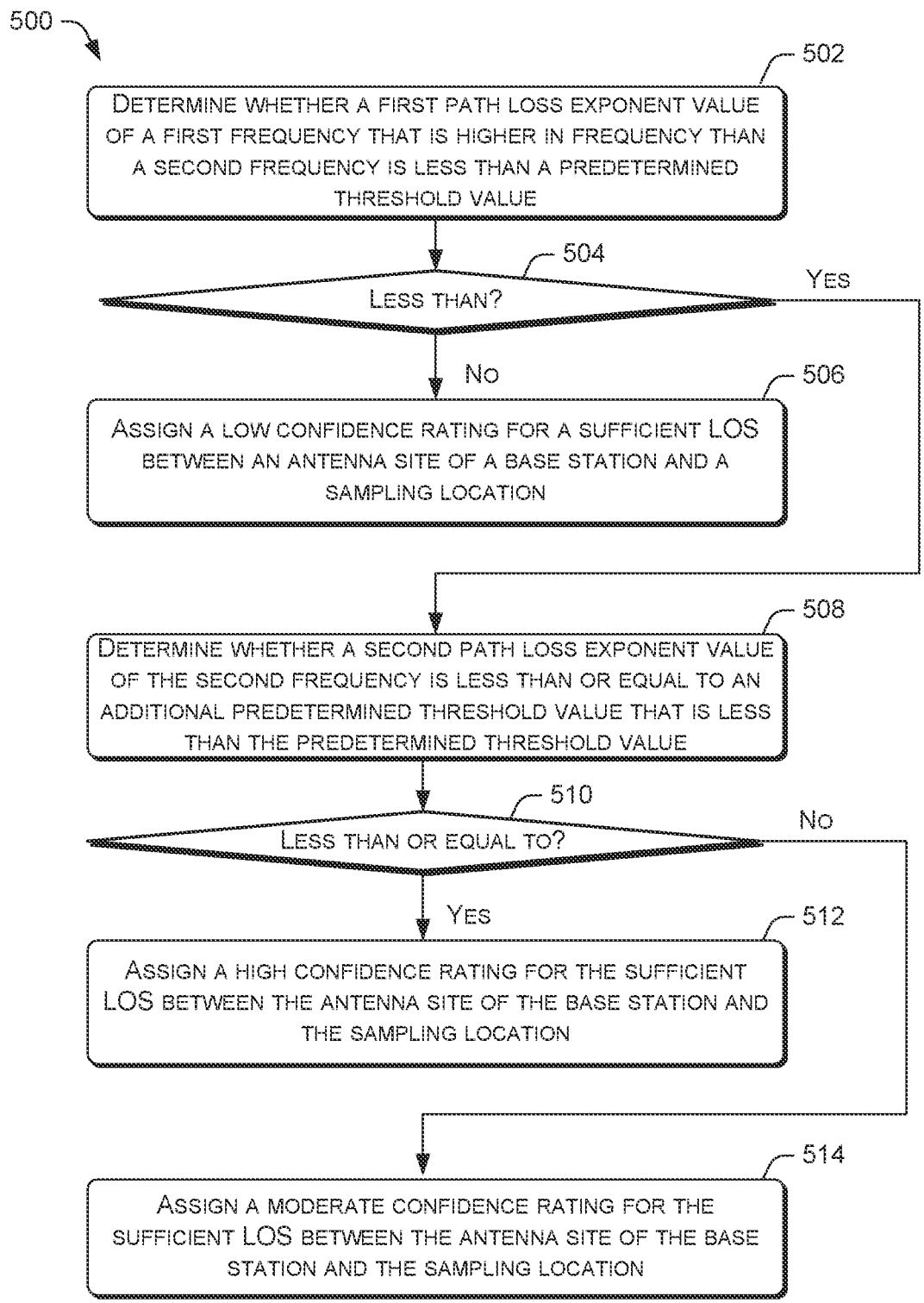
FIG. 5 is a flow diagram of an example process for assigning a confidence rating for whether there is a sufficient LOS from a base station to a sampling location based on multiple path loss exponents calculated for the base station.

The confidence rating module 216 may use the multiple path loss exponent values computed with respect to an antenna site for a sampling location to generate a confidence rating. The confidence rating may indicate a likelihood that there is a sufficient LOS from the antenna site to the sampling location for the deployment of an mmV radio antenna. For example, the confidence rating may be one of a low confidence, a moderate confidence, or a high confidence. The low confidence rating may indicate a low likelihood of a sufficient LOS, the moderate confidence rating may indicate a medium likelihood of a sufficient LOS, and the high confidence rating may indicate a high likelihood of a sufficient LOS. In various embodiments, such multiple path loss exponents may include exponents that are generated for a low-band radio signal, a mid-band radio, and/or a high-band radio signal. Accordingly, the confidence rating module 216 may use respective exponent value thresholds for the exponents for the low-band, mid-band, and high-band radio signals to generate a confidence rating. An example algorithm used by the confidence rating module 216 to determine a confidence rating based on multiple path loss components is illustrated in FIG. 5.

Alternatively, the machine-learning module 218 may use a machine-learning model 224 to analyze the multiple path loss exponents generated with respect to an antenna site for a sampling location. The analysis may generate a confidence rating based on the multiple path loss exponents for the sampling location. The machine-learning model 224 may be trained via a model training algorithm. The model training algorithm may implement a training data input phase, a feature engineering phase, and a model generation phase. In the training data input phase, the model training algorithm may receive training data. For example, each of the individual training datasets in the training data may include multiple sets of path loss exponents for multiple sampling locations, in which each set of path loss exponents is labeled with a corresponding confidence rating (e.g., low confidence, moderate confidence, or high confidence). Each of the set of path loss exponents may include exponents for low-band, mid-band, and/or high-band radio signals. During the feature engineering phase, the model training algorithm may pinpoint features in the training data. Accordingly, feature engineering may be used by the model training algorithm to figure out the significant properties and relationships of the input datasets that aid a machine-learning model to distinguish between different classes of data. During the model generation phase, the model training algorithm may select an initial type of machine-learning algorithm to train a machine-learning model using the training data. Following the application of a selected machine-learning algorithm to the training data, the model training algorithm may determine a training error measurement of the machine-learning model. If the training error measurement exceeds a training error threshold, the model training algorithm may use a rule engine to select a different type of machine-learning algorithm based on a magnitude of the training error measurement. The different types of machine-learning algorithms may include a Bayesian algorithm, a decision tree algorithm, a support vector machine (SVM) algorithm, an ensemble of trees algorithm (e.g., random forests and gradient-boosted trees), an artificial neural network, and/or so forth. The training process is generally repeated until the training results fall below the training error threshold and the trained machine-learning model is generated. Accordingly, the machine-learning module 218 may input a set of path loss exponents into the machine-learning model 224 to generate a corresponding confidence rating. The confidence ratings 226, as generated by the confidence rating module 216 or the machine-learning module 218, may be stored by the respective module in the data store 222.

The presentation module 220 may use the multiple confidence ratings that are computed for multiple sampling locations surrounding a base station to generate a visual representation that illustrates the suitability of an antenna site on the base station for mmV radio antenna deployment. The visual representation may be generated by the presentation module 220 for display via a web portal in response to a query received via the web portal. The web portal may include one or more web pages that enable a subscriber to submit the request and associated information. For example, the web pages may be in the form of HyperText Markup Language (HTML) documents, in which the documents may include text content, images, multimedia content, cascade style sheets (CSS), and/or scripts. The presentation module 220 may use an application server that supports server-side scripting via multiple scripting languages, such as Active Server Pages (ASP), Hypertext Preprocessor (PHP), JavaScript, and other scripting languages to support the dynamic generation of web pages based on user inputs. Accordingly, the web portal may be accessible via a web browser or a client application on a user device.

The visual representation may display one or more of the path loss exponent values associated with sampling locations surrounding the base station. Alternatively, or concurrently, the visual representation may display the one or more confidence ratings computed for each sampling location. In some embodiments, the visual representation may include a deployment suitability map that depicts the geographical area surrounding a base station and encompassing multiple sampling locations. The map may include color indicators of the confidence ratings at the various sampling locations near the base station, in which a unique color is used to illustrate a corresponding confidence rating. The colors may be assigned to icons (e.g., dots, blocks, symbols, etc.) that represent the sampling locations. For example, the color red may be used for sampling locations with low confidence ratings, the color yellow may be used for sampling locations with moderate confidence ratings, and the color green may be used for sampling locations with high confidence ratings. In some instances, the color indicators may be accompanied by corresponding path loss exponent values. By viewing the visual representation, a network engineer of the MNO may make a determination as to whether an mmV radio antenna is to be deployed at the antenna site. In some instances, since the antenna site may already have one or more existing antennas installed that provided the non-millimeter wave radio signal measurements used by the LOS prediction application 102, the mmV radio antenna may be installed immediately adjacent to the one or more existing antennas. Further, the mmV radio antenna may be aimed in a same direction or substantially the same direction as the one or more existing radio antennas.

Example Processes

Figure 4:
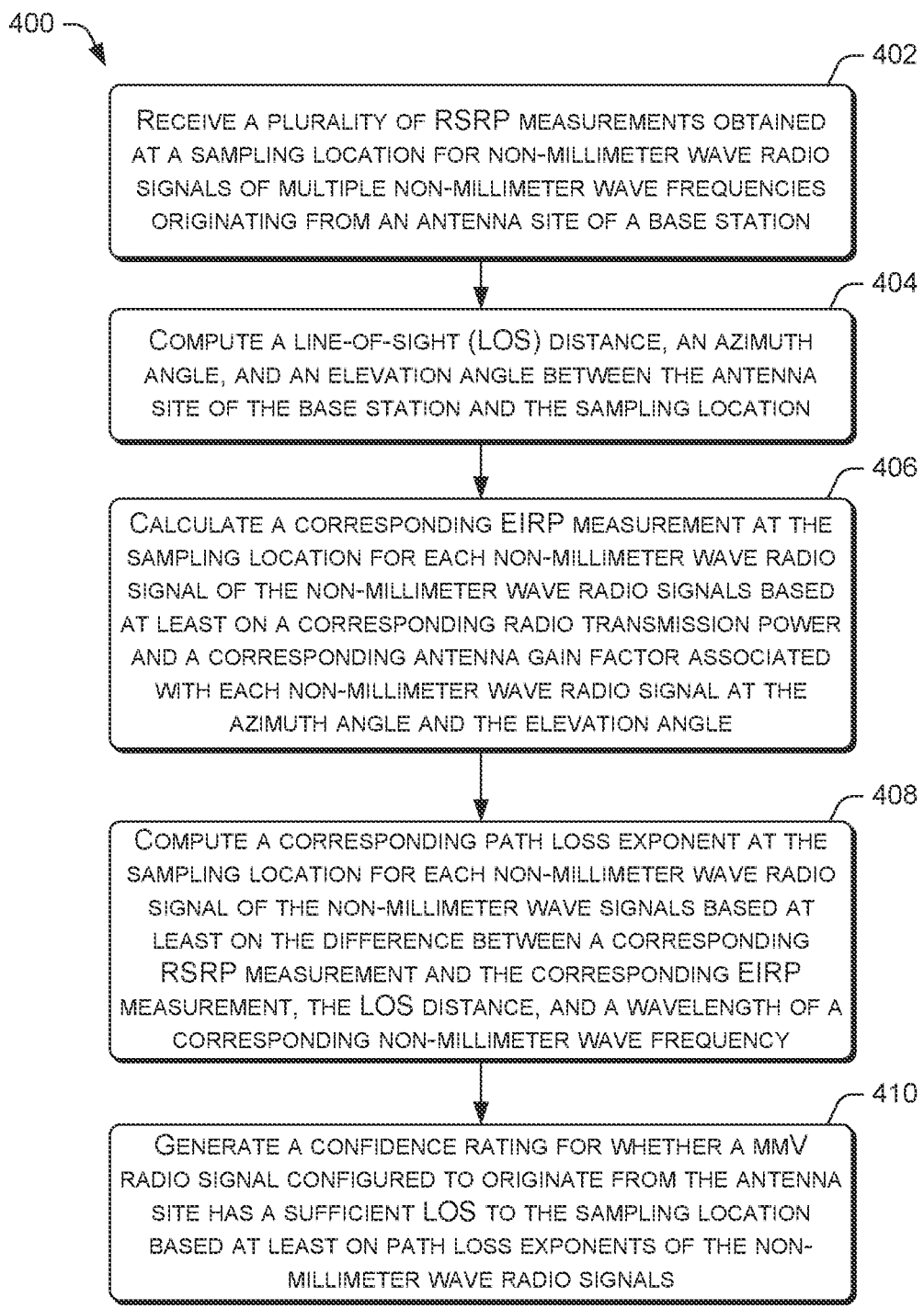
FIG. 4 is a flow diagram of an example process for generating a confidence rating for whether an mmV radio signal configured to originate from an antenna site has a sufficient LOS to a sampling location.
Figure 6:
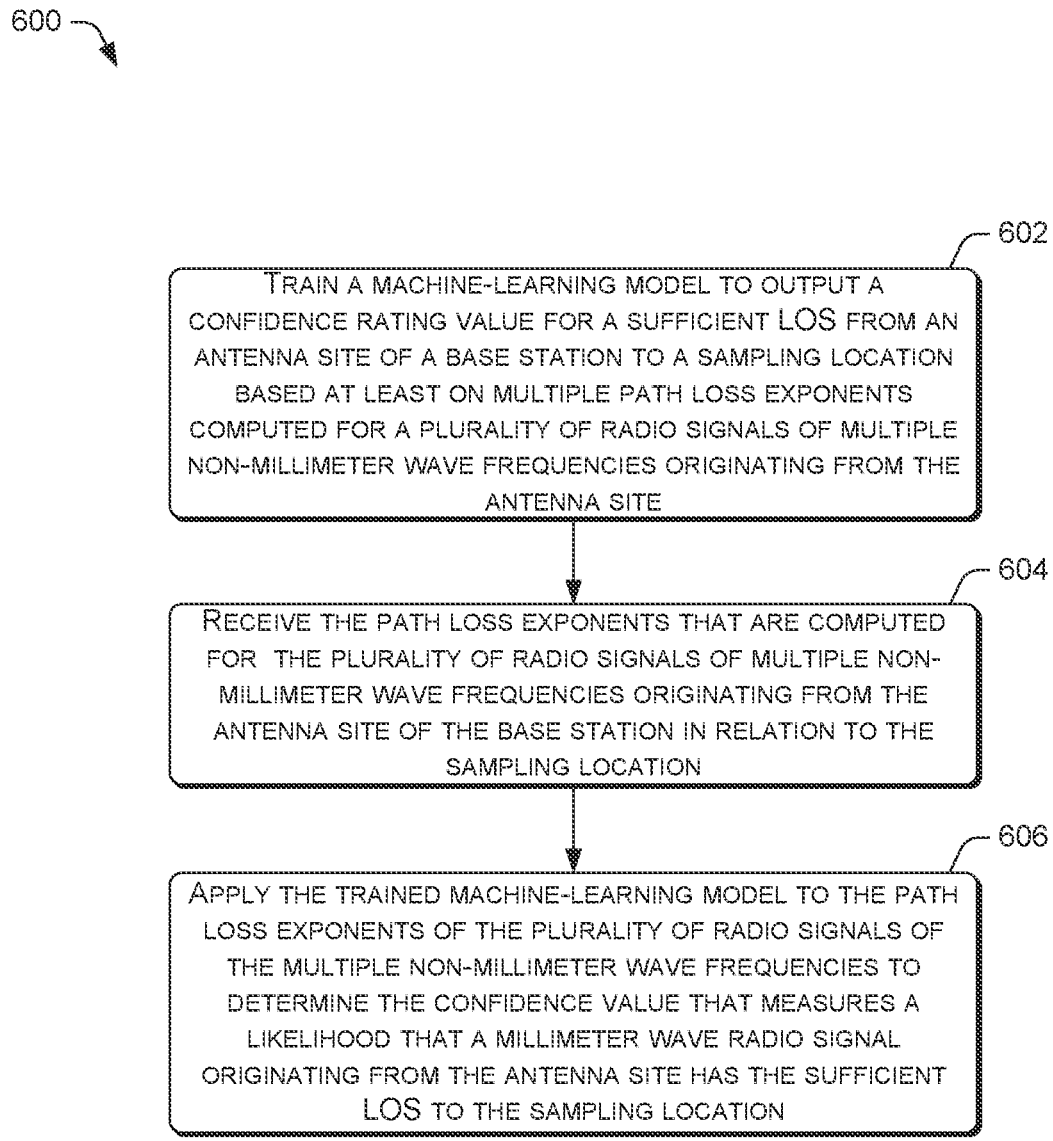
FIG. 6 is a flow diagram of an example process for using a machine-learning model to determine whether there is a sufficient LOS from a base station to a sampling location based on multiple path loss exponents calculated for the base station.

FIGS. 4-6 present illustrative processes 400-600 for using existing network data to predict whether there are sufficient mmV LOS radio wave paths around a base station for the deployment of an mmV radio antenna at an antenna site of the base station. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the architecture 100 of FIG. 1.

FIG. 4 is a flow diagram of an example process 400 for generating a confidence rating for whether an mmV radio signal configured to originate from an antenna site has a sufficient LOS to a sampling location. At block 402, the LOS prediction application 102 may receive a plurality of RSRP measurements obtained at a sampling location for non-millimeter wave radio signals of multiple non-millimeter wave frequencies originating from an antenna site of a base station. In various embodiments, the plurality of RSRP measurements may be obtained by a user device of a subscriber at the sampling location and stored in one or more network databases 110 as the network data 108 for retrieval by the LOS prediction application 102.

At block 404, the LOS prediction application 102 may compute a LOS distance, an azimuth angle, and an elevation angle between the antenna site of the base station and the sampling location. The computation may be performed based on the network data 108 retrieved from the one or more network databases 110. For example, the network data 108 may include geocoordinates of the base station and the sampling location, as well as heights of the user device at the sampling location and the antenna site.

At block 406, the LOS prediction application 102 may calculate a corresponding EIRP measurement at the sampling location for each non-millimeter wave radio signal based at least on a corresponding radio transmission power and a corresponding antenna gain factor associated with each non-millimeter wave radio signal at the azimuth angle and the elevation angle. An antenna gain factor may be dependent on the 3-dimensional ability of a corresponding antenna to focus energy in a specific direction specified by the elevation angle and the azimuth angle.

At block 408, the LOS prediction application 102 may compute a corresponding path loss exponent at the sampling location for each multiple non-millimeter radio signal based at least on the difference between a corresponding RSRP measurement and the corresponding EIRP measurement, the LOS distance, and a wavelength of a corresponding non-millimeter wave frequency. For example, the theoretical path loss exponent value for a completely clear LOS is 20. However, as environmental clutter increasingly diminishes the LOS, A will increasingly approach a value of 40.

At block 410, the LOS prediction application 102 may generate a confidence rating for whether an mmV radio signal configured to originate from the antenna site has a sufficient LOS to the sampling location based at least on path loss exponents of the non-millimeter wave radio signals. The confidence rating may indicate a likelihood that there is a sufficient LOS from the antenna site to the sampling location for the deployment of an mmV radio antenna. For example, the confidence rating may be one of a low confidence, a moderate confidence, or a high confidence.

FIG. 5 is a flow diagram of an example process 500 for assigning a confidence rating for whether there is a sufficient LOS from a base station to a sampling location based on multiple path loss exponents calculated for the base station. At block 502, the LOS prediction application 102 may determine whether a first path loss exponent value of a first frequency is less than a predetermined threshold value, in which the first frequency is higher in frequency than a second frequency. For example, the first frequency may be a high-band frequency, and the second frequency may be a mid-band frequency. In various embodiments, the example process 500 may be carried out by the confidence rating module 216 of the LOS prediction application 102.

At decision block 504, if the first path loss exponent value is not less than (but is equal to or greater than) the predetermined threshold value ("no" at the decision block 504), the process 500 may proceed to block 506. For example, in one instance, the predetermined threshold value may be a value of 24.5. At block 506, the LOS prediction application 102 may assign a low confidence rating for a sufficient LOS between an antenna site of a base station and a sampling location. However, if the first path loss exponent value is less than the predetermined threshold value ("yes" at the decision block 504), the process 500 may proceed to block 508. At block 508, the LOS prediction application 102 may determine whether a second path loss exponent value of the second frequency is less than or equal to an additional predetermined threshold value, in which the additional predetermined threshold value is less than the predetermined threshold value. For example, in one instance, the predetermined threshold value may be a value of 23.

At decision block 510, if the second path loss exponent value is less than or equal to the additional predetermined threshold value ("yes" at decision block 510), the process 500 may proceed to block 512. At block 512, the LOS prediction application 102 may assign a high confidence rating for the sufficient LOS between the antenna site of the base station and the sampling location. However, if the second path loss exponent value is not less than or equal to the additional predetermined threshold value ("no" at decision block 510), the process 500 may proceed to block 514. At block 514, the LOS prediction application 102 may assign a moderate confidence rating for the sufficient LOS between the antenna site of the base station and the sampling location.

FIG. 6 is a flow diagram of an example process 600 for using a machine-learning model to determine whether there is a sufficient LOS from a base station to a sampling location based on multiple path loss exponents calculated for the base station. At block 602, the LOS prediction application 102 may train a machine-learning model to output a confidence rating value for a sufficient LOS for an antenna site of a base station to a sampling location based at least on the multiple path loss exponents computed for the plurality of radio signals of multiple non-millimeter wave frequencies originating from the antenna site. In some embodiments, the machine-learning model may be trained using training data sets, in which each of the individual training datasets in the training data may include multiple sets of path loss exponents for multiple sampling locations, in which each set of path loss exponents is labeled with a corresponding confidence rating (e.g., low confidence, moderate confidence, or high confidence). Each of the set of path loss exponents may include exponents for low-band, mid-band, and/or high-band radio signals.

At block 604, the LOS prediction application 102 may receive the path loss exponents that are computed for the plurality of radio signals of multiple non-millimeter wave frequencies originating from the antenna site of the base station in relation to the sampling location. In various embodiments, the path loss exponents may be computed in advance by the LOS prediction application 102. Accordingly, the LOS prediction application 102 may retrieve the path loss exponents for a data cache, such as the data store 222, for processing by the machine-learning model.

At block 606, the LOS prediction application 102 may apply the trained machine-learning model to the pass loss exponents of the plurality of radio signals of the multiple non-millimeter wave frequencies to determine a confidence rating value that measures a likelihood that a millimeter wave radio signal originating from the antenna site has sufficient LOS to the sampling location.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

receiving a plurality of Reference Signal Received Power (RSRP) measurements obtained at a sampling location for non-millimeter wave radio signals of multiple non-millimeter wave frequencies originating from an antenna site of a base station;

computing a line-of-sight (LOS) distance, an azimuth angle, and an elevation angle between the antenna site of the base station and the sampling location;

calculating a corresponding Effective Isotropic Radiated Power (EIRP) measurement at the sampling location for each non-millimeter wave radio signal of the non-millimeter wave radio signals based at least on a corresponding radio transmission power and a corresponding antenna gain factor associated with each non-millimeter wave radio signal at the azimuth angle and the elevation angle;

computing a corresponding path loss exponent at the sampling location for each non-millimeter wave radio signal of the non-millimeter wave radio signals based at least on a difference between a corresponding RSRP measurement and the corresponding EIRP measurement, the LOS distance, and a wavelength of a corresponding non-millimeter wave frequency; and generating a confidence rating for whether a millimeter wave radio signal configured to originate from the antenna site has a sufficient LOS to the sampling location based at least on path loss exponents of the non-millimeter wave radio signals.

2. The one or more non-transitory computer-readable media of claim 1, wherein the multiple non-millimeter wave frequencies includes a first frequency that is higher in frequency than a second frequency, and wherein determining includes assigning a low confidence rating for the sufficient LOS when a first path loss exponent of the first frequency is equal to or greater than a predetermined threshold value.

3. The one or more non-transitory computer-readable media of claim 2, wherein the determining includes assigning a moderate confidence rating for the sufficient LOS when the first path loss exponent of the first frequency is less than the predetermined threshold value, and a second path loss exponent of the second frequency is greater than an additional predetermined threshold value, in which the additional predetermined threshold value is less than the predetermined threshold value.

4. The one or more non-transitory computer-readable media of claim 3, wherein the determining includes assigning a high confidence rating for the sufficient LOS when the first path loss exponent of the first frequency is less than the predetermined threshold value, and the second path loss exponent of the second frequency is less than or equal to the additional predetermined threshold value.

5. The one or more non-transitory computer-readable media of claim 4, wherein the acts further comprising presenting an indicator via a visual representation that corresponds to the low confidence rating, the moderate confidence rating, or the high confidence rating, and wherein the indicator includes at least one of a corresponding color or a corresponding path loss exponent value.

6. The one or more non-transitory computer-readable media of claim 5, wherein the indicator is displayed on a map of a geographical area that includes the base station with one or more other indicators that indicate at least one confidence rating for sufficient LOS of one or more other corresponding sampling locations.

7. The one or more non-transitory computer-readable media of claim 1, wherein the generating includes analyzing the path loss exponents of the non-millimeter wave radio signals via a machine-learning algorithm to determine a confidence value that measures a likelihood that the millimeter wave radio signal originating from the antenna site has a sufficient LOS to the sampling location.

8. The one or more non-transitory computer-readable media of claim 1, wherein the millimeter wave radio signal is configured to broadcast from a radio antenna that is located adjacent to an existing radio antenna of the base station that is broadcasting at least one of the non-millimeter wave radio signals, in which the radio antenna is aimed in a same direction or substantially the same direction as the existing radio antenna.

9. The one or more non-transitory computer-readable media of claim 1, wherein the receiving includes obtaining latitudes, longitudes, and elevations of the antenna site and the sampling location and the plurality of RSRP measurements from at least one of one or more databases or via at least one measurement device.

10. The one or more non-transitory computer-readable media of claim 9, wherein the computing the LOS distance, the azimuth angle, and the elevation angle includes computing the LOS distance, the azimuth angle, and the elevation angle based at least on the latitudes, the longitudes, and the elevations of the antenna site and the sampling location.

11. The one or more non-transitory computer-readable media of claim 1, wherein a corresponding antenna gain factor associated with a non-millimeter wave radio signal is at least dependent on a radiation pattern of an antenna that is broadcasting a radio signal of the non-millimeter wave frequency.

12. The one or more non-transitory computer-readable media of claim 1, wherein the multiple non-millimeter wave frequencies of the non-millimeter wave radio signals are of different frequencies that include a low-band frequency, a mid-band frequency, and a high-band frequency.

13. A system, comprising:
one or more processors; and
memory including a plurality of computer-executable components that are executable by the one or more processors to perform a plurality of actions, the plurality of actions comprising:
receiving a plurality of Reference Signal Received Power (RSRP) measurements obtained at a sampling location for non-millimeter wave radio signals of multiple non-millimeter wave frequencies originating from an antenna site of a base station;
computing a line-of-sight (LOS) distance, an azimuth angle, and an elevation angle between the antenna site of the base station and the sampling location;
calculating a corresponding Effective Isotropic Radiated Power (EIRP) measurement at the sampling location for each non-millimeter wave radio signal of the non-millimeter wave radio signals based at least on a corresponding radio transmission power and a corresponding antenna gain factor associated with each non-millimeter wave radio signal at the azimuth angle and the elevation angle; and
computing a corresponding path loss exponent at the sampling location for each non-millimeter wave radio signal of the non-millimeter wave radio signals based at least on a difference between a corresponding RSRP measurement and the corresponding EIRP measurement, the LOS distance, and a wavelength of a corresponding non-millimeter wave frequency.

14. The system of claim 13, wherein the plurality of actions further comprise generating a confidence rating for whether a millimeter wave radio signal configured to originate from the antenna site has a sufficient LOS to the sampling location based at least on path loss exponents of the non-millimeter wave radio signals.

15. The system of claim 14, wherein the generating includes analyzing the path loss exponents of the non-millimeter wave radio signals via a machine-learning algorithm to determine a confidence value that measures a likelihood that the millimeter wave radio signal originating from the antenna site has a sufficient LOS to the sampling location.

16. The system of claim 14, wherein the confidence rating is one of a low confidence rating, a moderate confidence rating, or a high confidence rating, and wherein the acts further comprising presenting an indicator via a visual representation that corresponds to the low confidence rating, the moderate confidence rating, or the high confidence rating, and wherein the indicator includes at least one of a corresponding color or a corresponding path loss exponent value.

17. The system of claim 16, wherein the indicator is displayed on a map of a geographical area that includes the base station with one or more other indicators that indicate at least one confidence rating for sufficient LOS of one or more other corresponding sampling locations.

18. The system of claim 13, wherein the millimeter wave radio signal is configured to broadcast from a radio antenna that is located adjacent to an existing radio antenna of the base station that is broadcasting at least one of the non-millimeter wave radio signals, in which the radio antenna is aimed in a same direction or substantially the same direction as the existing radio antenna.

19. The system of claim 13, wherein the multiple non-millimeter wave frequencies of the non-millimeter wave radio signals are of different frequencies that include a low-band frequency, a mid-band frequency, and a high-band frequency.

20. A computer-implemented method, comprising:
receiving, at one or more computing nodes, a plurality of Reference Signal Received Power (RSRP) measurements obtained at a sampling location for non-millimeter wave radio signals of multiple non-millimeter wave frequencies originating from an antenna site of a base station;
computing, at the one or more computing nodes, a line-of-sight (LOS) distance, an azimuth angle, and an elevation angle between the antenna site of the base station and the sampling location;
calculating, at the one or more computing nodes, a corresponding Effective Isotropic Radiated Power (EIRP) measurement at the sampling location for each non-millimeter wave radio signal of the non-millimeter wave radio signals based at least on a corresponding radio transmission power and a corresponding antenna gain factor associated with each non-millimeter wave radio signal at the azimuth angle and the elevation angle;
computing, at the one or more computing nodes, a corresponding path loss exponent at the sampling location for each non-millimeter wave radio signal of the non-millimeter wave radio signals based at least on a difference between a corresponding RSRP measurement and the corresponding EIRP measurement, the LOS distance, and a wavelength of a corresponding non-millimeter wave frequency; and
generating, at the one or more computing nodes, a confidence rating for whether a millimeter wave radio signal configured to originate from the antenna site has a sufficient LOS to the sampling location based at least on path loss exponents of the non-millimeter wave radio signals.

* * * * *